United States Patent [19]
Suzuki et al.

[11] Patent Number: 5,160,954
[45] Date of Patent: Nov. 3, 1992

[54] VIEWFINDER FOR CAMERA

[75] Inventors: Nobuharu Suzuki, Aichi; Tahei Morisawa, Tokyo, both of Japan

[73] Assignee: Asahi Kogaku Kogyo Kabushiki Kaisha, Tokyo, Japan

[21] Appl. No.: 557,062

[22] Filed: Jul. 25, 1990

[30] Foreign Application Priority Data

Jul. 26, 1989 [JP] Japan .................................. 1-193304
Feb. 22, 1990 [JP] Japan .................................. 2-41460

[51] Int. Cl.$^5$ ...................... G03B 13/12; G03B 13/14
[52] U.S. Cl. ..................................... 354/221; 354/222
[58] Field of Search ...................... 354/199, 221, 222

[56] References Cited

U.S. PATENT DOCUMENTS

| | | | |
|---|---|---|---|
| 3,836,934 | 9/1974 | Suzuki et al. | 354/197 |
| 4,164,369 | 8/1979 | Urano et al. | 354/219 |
| 4,219,264 | 8/1980 | Rodeck | 354/162 |
| 4,924,247 | 5/1990 | Suzuki et al. | 354/164 |
| 4,944,030 | 7/1990 | Haraguchi et al. | 354/403 |
| 4,967,219 | 10/1990 | Morisawa et al. | 354/199 |

FOREIGN PATENT DOCUMENTS

| | | |
|---|---|---|
| 2363796 | 7/1974 | Fed. Rep. of Germany . |
| 2740929 | 3/1979 | Fed. Rep. of Germany . |
| 60-33541 | 2/1985 | Japan . |
| 60-70411 | 4/1985 | Japan . |
| 710976 | 6/1954 | United Kingdom . |

OTHER PUBLICATIONS

French Search Report and Annex, FR 9009508, Oct. 28, 1991.
"Parallax Correction" (Ruben), Research Disclosure, vol. 2244, No. 249, p. 57, Jan., 1985.
Copy of the United Kingdom Search Report, Application No. 9016367.6, Aug. 30, 1990.

*Primary Examiner*—Michael L. Gellner
*Attorney, Agent, or Firm*—Sandler, Greenblum & Bernstein

[57] ABSTRACT

A viewfinder is provided for being mounted on a camera containing a photographing lens which is based from the optical axis of the viewfinder. A parallax correcting prism insertable into and extractable from the axis of the viewfinder as provided. The camera is arranged such that the space occupied by the parallax-correcting prism is minimized so as to allow design freedom for the camera. The viewfinder is also designed to decrease the difference in the diopter and the fuzziness of the image between normal photographing mode and a macro photographing mode. A driving mechanism is provided to move the prism in a direction substantially normal to the axis of a viewfinder lens system in order to insert it and remove it from the optical axis of the viewfinder. According to a further feature of the invention, the prism can include a curved surface having a magnifying power.

15 Claims, 8 Drawing Sheets

VIEWFINDER FOR CAMERA

BACKGROUND OF THE INVENTION

1. FIELD OF THE INVENTION

This invention relates to a viewfinder mounted on a camera separately from a taking lens, and more specifically to a viewfinder having a prism for correcting parallax relative to the taking lens in a macro photographing mode.

2. DESCRIPTION OF THE PRIOR ART

Heretofore a camera including a viewfinder separated from a taking lens such as a lens shutter camera are known or a still video camera. The viewfinders of these conventional cameras have in principle parallax due to the difference in the direction of optical axis of the finder from that of the taking lens. This parallax can vary according to the distance from a camera to a photographic object, and it is desirable to decrease the parallax in actual photographing.

Besides a normal photographing mode, some of the conventional cameras have a macro photographing mode for photographing short-distance subject which can not be taken in the normal photographic mode.

Since a normal mode camera is preset to minimize the parallax for normal photographing, it has high parallax a the short distance for macro photographing.

In order to minimize this parallax upon macro photographing, some of the conventional cameras have a rotatable correcting prism for insertion across the optical path of the viewfinder and other cameras have a movable visual field frame in the viewfinder optical system.

Figure 12:
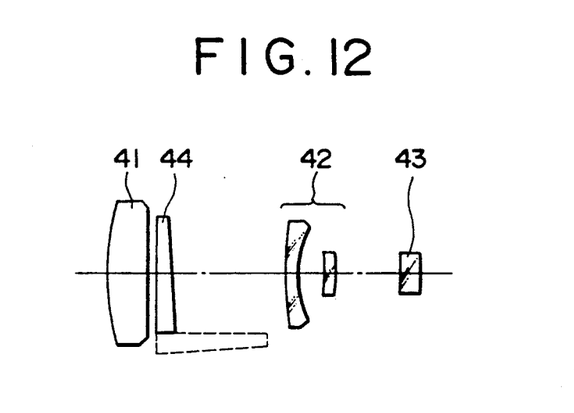
FIG. 12 is a schematic view showing an arrangement of optical elements of a viewfinder using the conventional prism.

FIG. 12 shows a schematic view of a mechanism for inserting a prism. This reversed Galilian zoom viewfinder has a first lens group 41, a second lens group 42 movable for variable power magnification, and an eyepiece group 43. The magnification of the viewfinder is changeable according to that of a taking lens. The parallax is decreased by inserting the prism 44 between the first lens group 41 and the second lens group 42 and thereby bends its optical path to the taking lens side upon macro photographing.

Figure 13:
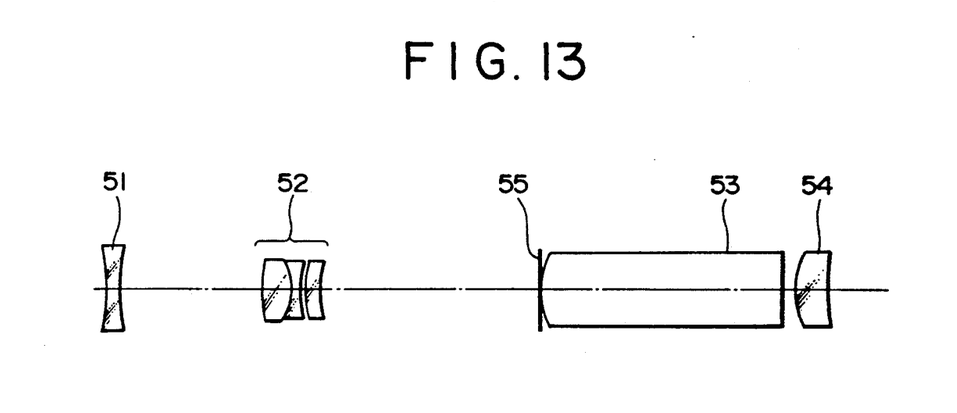
FIG. 13 is a semantic view showing an arrangement of optical elements of a viewfinder which does not use the conventional prism.

FIG. 13 is a schematic view showing the moving of the visual field frame of a viewfinder. This zoom viewfinder has a first lens group 51, a second lens group 52 movable for variable power, a Porro prism 53 for erecting images, and an eyepiece 54. A visual field frame 55 is mounted on the vicinity of the image formation position of a photographic object. The parallax upon macro photographing is corrected by moving the visual field frame in the direction normal to the optical path and thereby an accurate visual field is gained.

Referring to FIG. 12, the prism on the optical axis is rotated in order to be inserted into the optical path and to be extracted from the path, and requires a comparatively wide space for its rotation. Therefore the lens-arrangement is restricted by this space.

In FIGS. 12 and 13, a high magnification of the viewfinder causes a great difference between the diopter (i.e., the magnification power of the viewfinder) upon macro photographing to a short distance object, and that upon normal photographing to a standard distance object. A range of the above difference often surpasses the adjustable range of the diopter of a photographer's eye. Since a standard diopter is preset generally within the available distance for normal photographing, a large change of the diopter for macro photographing from a standard diopter makes fuzziness of an image in the viewfinder upon macro photographing.

When the distance to a photographic object is defined as U, measured in meters, the standard object distance for setting a diopter is defined as $U_o$ measured in meters, and the magnification of the visual field in the viewfinder is defined as M, the diopter difference between one object located at $U_o$ and another object located at U will be as follows:

$$\Delta D = (U^{-1} - U_o^{-1})M^2$$

For example, when $M=1.2$, $U_o=3$ m, and the standard diopter $D=-1$, are each defined, the result is $\Delta D=0.96$, and $D=-1.96$ in the macro mode in the case of $U=1$.

Both a high magnification of the viewfinder and a large difference between the standard distance for adjustable diopter and the actual distance requires much change from the standard diopter. Recently, zoom ratio, in another word, difference between the focal distances of a short focal distance side and a long focal distance side, intends to become large. Therefore, the diopter upon macro photographing by long focal distance to a short distance object largely changes from standard diopter for normal photographing.

SUMMARY OF THE INVENTION

To resolve the foregoing problems, an object of the present invention is to provide a viewfinder wherein the occupying space of a parallax-correcting prism in the lens group is small and accordingly the optical design can be freely carried out.

Another object of the present invention is to provide a viewfinder which can decrease the difference from the standard diopter and diminish fuzziness of the image.

To achieve the first object, a viewfinder for a camera according to this invention is constituted so that a parallax correcting prism is disposed to slide in the direction normal to the axis of the finder lens group for inserting in to the optical path and extraction therefrom.

To achieve the second object, a viewfinder of the present invention is further characterized in that at least one surface of the prism is powerful and curved. By this constitution, the image of the viewfinder upon macro photographing can be cleared by setting the curvature of the prism surface so as to diminish the difference between the diopters of macro-photographing and normal photographing.

Although the prism can be inserted in a optional position, the fuzziness of the image through the finder lens group can be diminished by inserting the prism into the object side rather than into the viewfinder lens group because of changelessness of the axis of the viewfinder lens (i.e., the optical axis is thus not changed internally of the viewfinder when the prism is inserted in front of the object lens of the viewfinder).

DETAILED DESCRIPTION OF THE EMBODIMENT

The embodiment of the present invention will be described hereinafter with reference to the accompanying drawings.

FIGS. 1 through 11 show the embodiment adapting the present invention to a zoom viewfinder.

Figure 1:
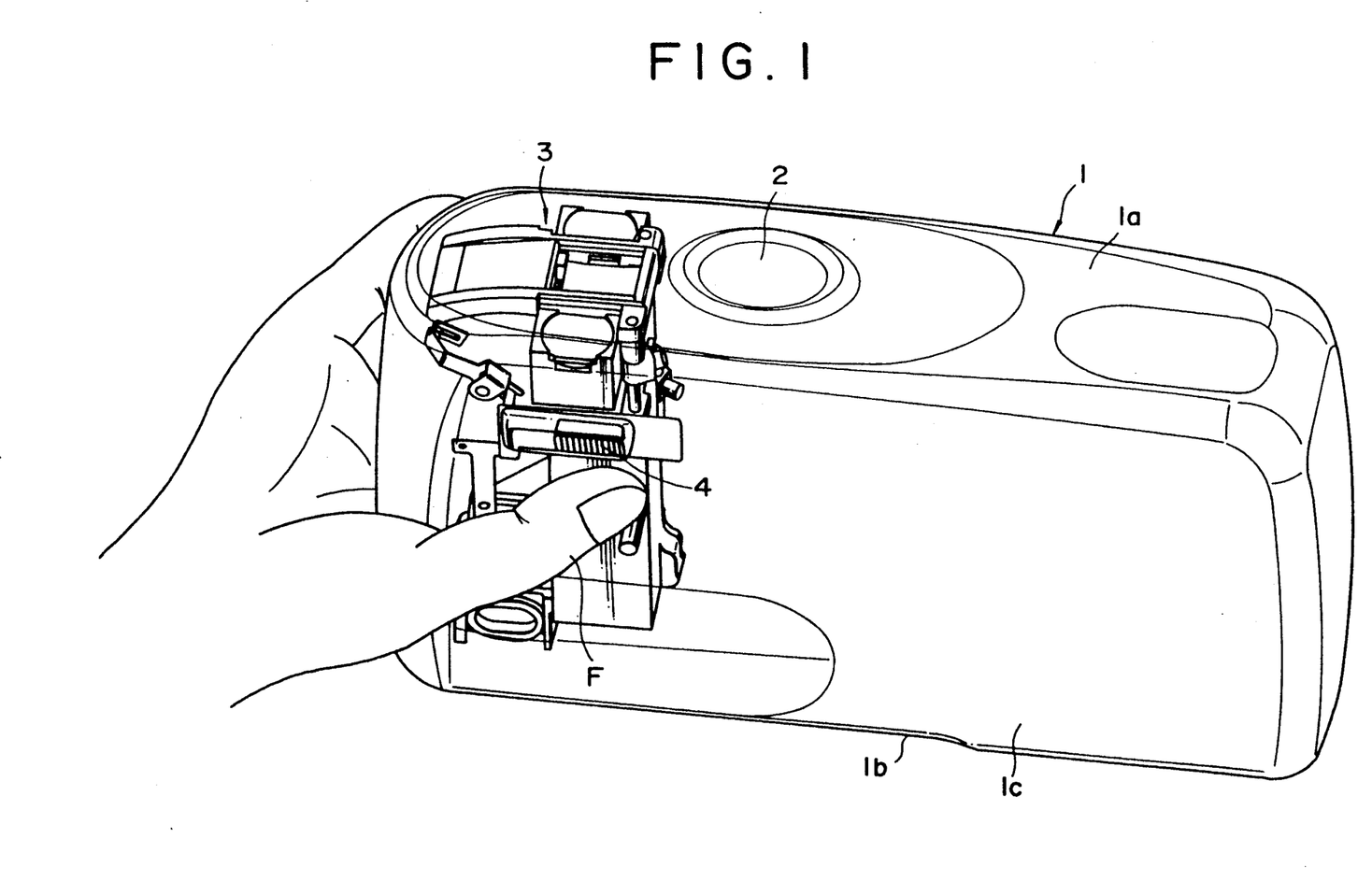
FIG. 1 is a perspective side view showing the whole constitution of a camera including a viewfinder according to the present invention.

FIG. 1 shows a camera including a viewfinder in accordance with the present invention, and the numerals 1, 2, and 3 designate a camera body, a taking lens, and a viewfinder, respectively. In the embodiment, the side mounting the taking lens 2 is defined as a front side 1a, and the side mounting the viewfinder through which a photographer gazes is defined as a back side 1b. The broad surface of the upper part of the body is defined as an upper surface, mounting a release button and a zoom lever. The broad surface of the lower part of the body 1 is defined as a lower surface 1c, mounting a macro lever 4 for switching camera modes between macro and normal photographing. The macro lever 4 is disposed in a position where the photographer can operate it with the thumb F in having the camera.

The taking lens 2, of which focal distance can be changed by operating a zoom lever, is a zoom lens. The lens 2 can be disposed at a suitable position for macro photographing upon a macro photographing mode.

Figure 2:
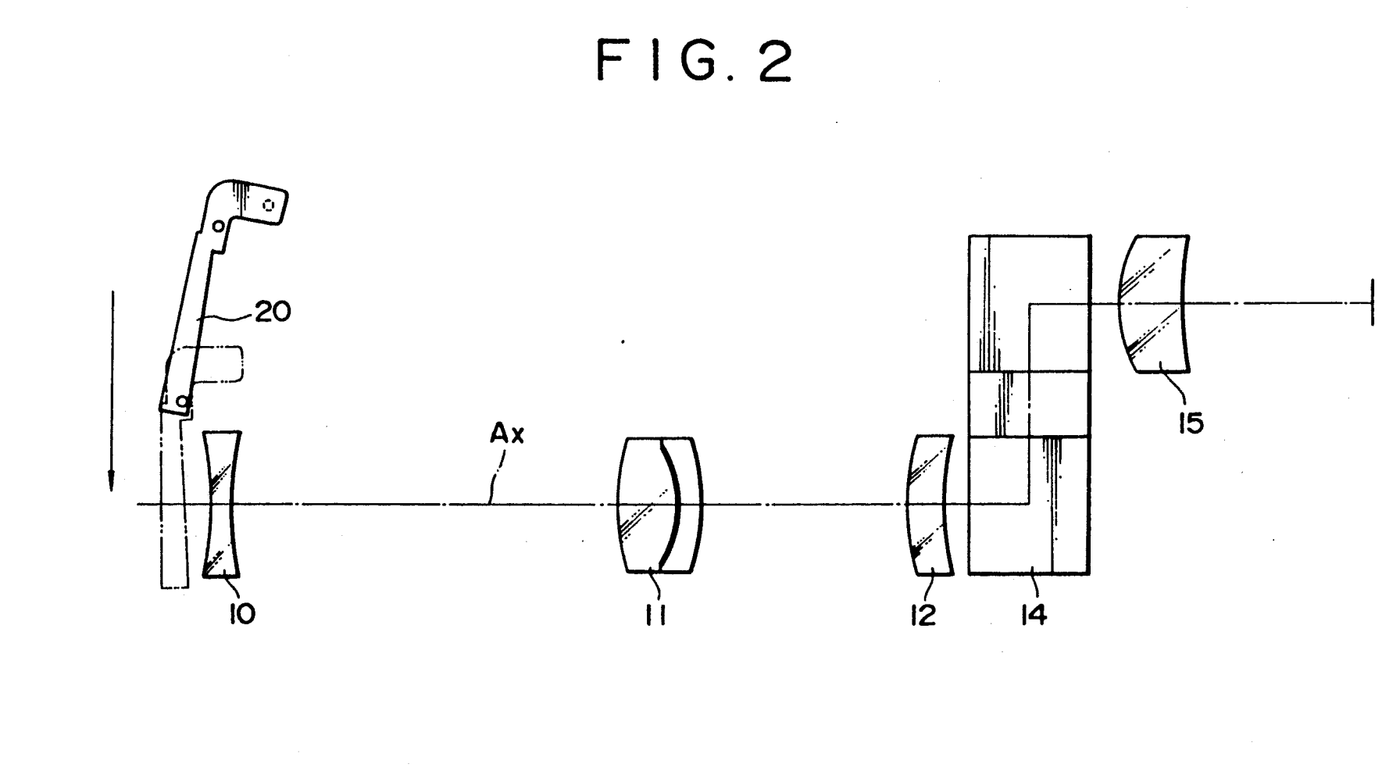
FIG. 2 is a plan view showing an arrangement of the optical elements of a viewfinder.
Figure 3:
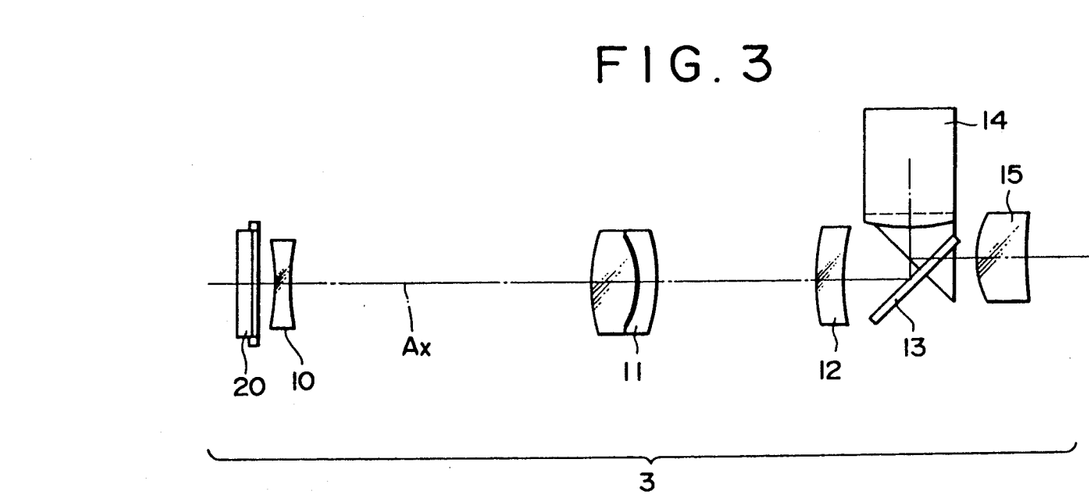
FIG. 3 is a side view of FIG. 2.

Referring to FIGS. 2 and 3, the optical system of the viewfinder 3 has the arrangement of the order from the object side of a first lens group 10 having a negative power, a second lens group 11 having a positive power as a whole of the adhered lenses, a third lens group 12 having a positive power, a mirror 13, a Porro prism 14 for erecting an image, and an eyepiece lens 15.

The first and second lens groups 10 and 11 are disposed to move in the direction of the optical axis Ax in order to change the magnification of the viewfinder 3. And the visual field of the viewfinder can be changed by the lens groups' moving in the direction of the axis according to the zooming of the taking lens 2.

Figure 4:
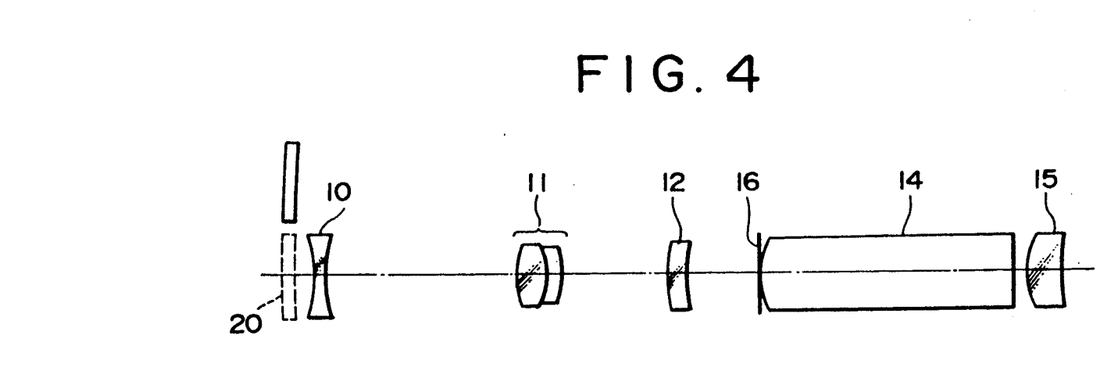
FIG. 4 is a schematic view of FIG. 2.

FIG. 4 shows a schematic plan view of the viewfinder optics including the Porro prism 14. The 1st through 3rd lenses comprise an object optical system. A visual field glass 15, on which frames for the visual field and for measuring the distance, etc., are each drawn, is disposed in the vicinity of an image-formation surface by the object optical system.

A prism 20 is slidably disposed in the front of the first lens group 10 in order to insert into or deflect from the optical axis of the viewfinder 3.

Figure 5:
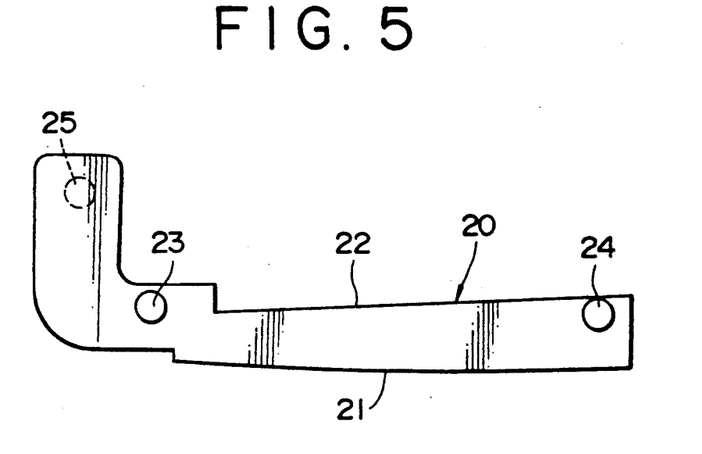
FIG. 5 is a plan view of a prism for a viewfinder in the embodiment.
Figure 6:
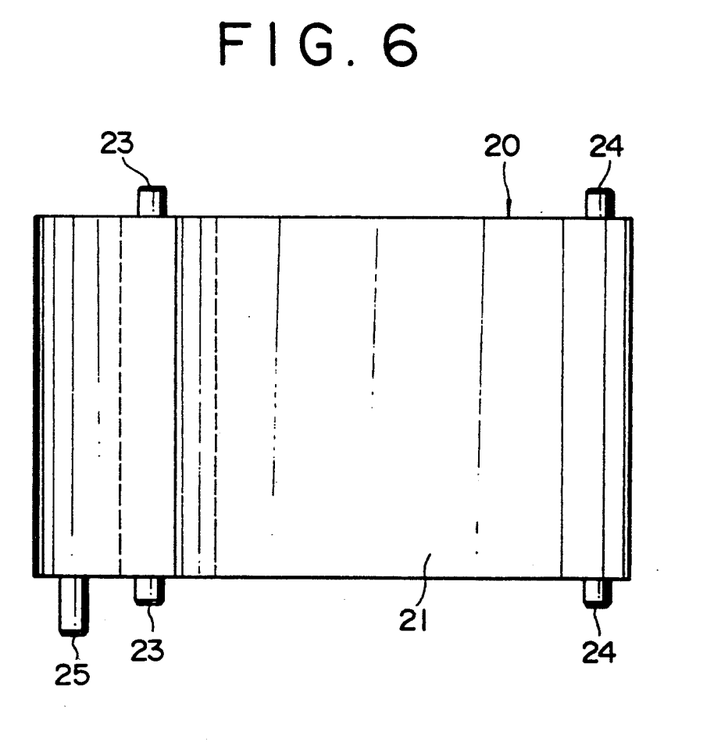
FIG. 6 is a front view of a prism for a viewfinder in the embodiment.

As shown in FIGS. 5 and 6, the prism 20 is formed in the shape of the letter L when seen in a plane view of the prism or in the shape of a rectangle when seen in the front view of the prism. Portions of the prism inserted in the axis are a curved surface having a predetermined power in the object side surface 21, a plane predetermined power in the object side surface 21, a plane slanting at a predetermined angle to the lens system axis Ax, in the surface 22 of the first lens group 10 side, and an approximately wedged shape in a sectional surface of the sliding direction of the prism 20. The wedge shaped section of the prism 20 can best be visualized by viewing a cross-section as revealed by a section line extending horizontally through the FIG. 6 view of the prism. The curved surface 21 is a convex spherical surface having a large radius of curvature which is predetermined so that the difference between the object diopters upon macro and normal photographing decreases. The surface of the curved surface 21 can be formed in not only a spherical surface but also a non-spherical surface in order to correct an aberration or the like.

A pair of guide pins 23, 24 projecting upward and downward are each mounted on the upper and lower surfaces of the prism 20, and a cam-follower pin 25 is also mounted on the lower surface of the edge portion. The prism 20 is slidingly inserted in the front of the lens system and then bends the optical axis of the viewfinder to the axis of the taking lens side for correcting the parallax and controlling the difference from the standard negative diopter by changing to a plus diopter upon macro photographing.

Insertion of the prism 20 in the front of the lens system does not have a bad effect on the function of the lens system because of changelessness of the optical axis in the lens system. Therefore the inferiority of the viewfinder image can be checked. On the other hand, insertion in the middle of the lens system creates inferiority of the viewfinder image because of the change of the axis between the insertion and extraction.

Description of the mechanical constitution of a viewfinder will be given in accordance with FIGS. 7 through 11.

Figure 7:
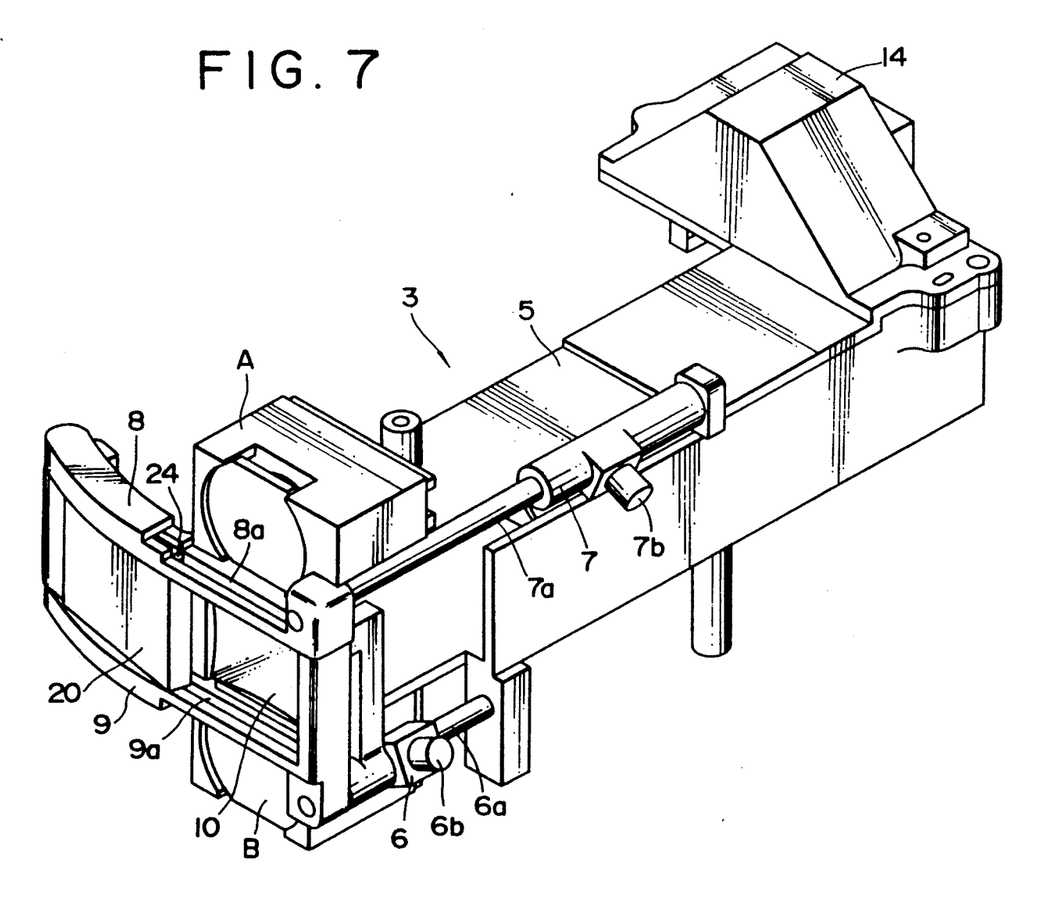
FIG. 7 is a perspective side view of a viewfinder in the embodiment as viewed from an object side.

FIG. 7 is a perspective view of the viewfinder as viewed from a photographic object.

The viewfinder 3 has a casing 5 including the foregoing lens system in the inside and comprising a frame unit 6 having a slidable first lens group 10, and a frame unit 7 having a slidable second lens group 9. Each frame units 6 and 7 is constituted slidably with the sliding axes 6a and 7a fixed to the casing. Each frame unit is driven by a driving mechanism (not shown) connected with the stopping pins 6b, 7b according to zooming of the taking lens.

On the surface facing the object of the casing 5, a pair of guide rails are mounted along the line from the optical axis of the viewfinder to the front side 1a of the camera body 1. These guide rails have guide grooves 8a, 9a engaging guide pins 23, 24 of the prism 20. The rails are disposed on both the upper side and lower side of the optical path of the viewfinder. A pair of the rails 8, 9 cross the optical path of the viewfinder. A straight part of these rails crosses the optical path, and a curved part of the rails is disposed out of this path. The prism 20 moves slidably by the guide rails 8, 9 and is thereby inserted into or extracted from the optical path of the viewfinder.

The boxes A, B fixed to the casing on the upper and lower positions on both sides of the prism are a light-emitting unit, and a light-receiving unit, respectively to measure the distance to the photographic object, as shown in FIG. 7.

Figure 8:
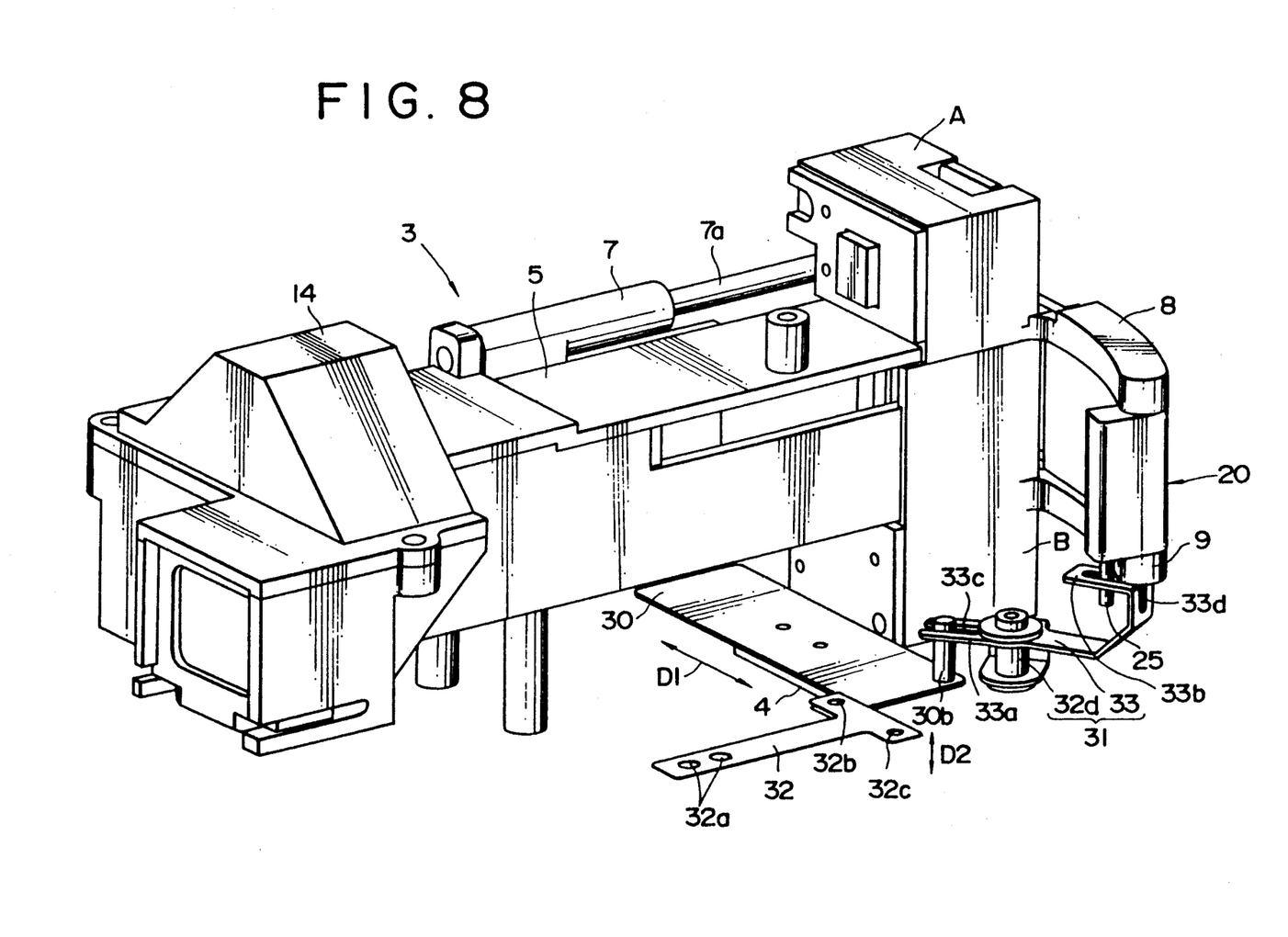
FIG. 8 is a perspective side view of a viewfinder in the embodiment as viewed from an eyepiece side.

Hereinafter, the mechanism for driving the prism 20 will be described. Referring to FIG. 8, a macro lever 4 projecting from the lower surface 1c of the body is fixed to a slide plate 30 mounted inside the body. The prism 20 can slide by operating the macro lever 4 via a delivering mechanism 31.

Figure 9:
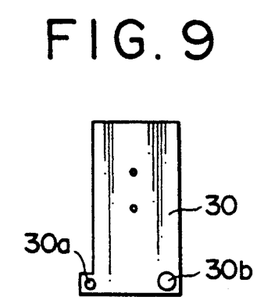
FIG. 9 is a plan view showing a slide plate part in the embodiment.
Figure 10:
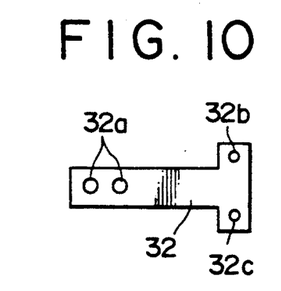
FIG. 10 is a plan view showing a click plate part in the embodiment.

A slide plate 30 fastening the macro lever 4 is formed approximately rectangular-shaped and can go back and forth in the direction D1(direction vertical to the viewfinder axis) in which the photographer's thumb F bends. As shown in FIG. 9, the slide plate 30 is constituted of an engaging protuberance 30a for giving a click-like impression in sliding by a click plate 32, and an engaging pin 30b for engaging with the delivering mechanism. In FIG. 10, an elastic click plate 32 formed in a T-shape is constituted by of a lug hole 32a for the camera body, and engaging holes 32b, 32c for engaging with the protuberance 30a of the slide plate 30. The part of the click plate 32 facing the slide plate 30 can be movable in the upward or downward direction D2 as shown in FIG. 8. The engaging holes 32b, 32c have the function of determining first and second stop positions.

Figure 11:
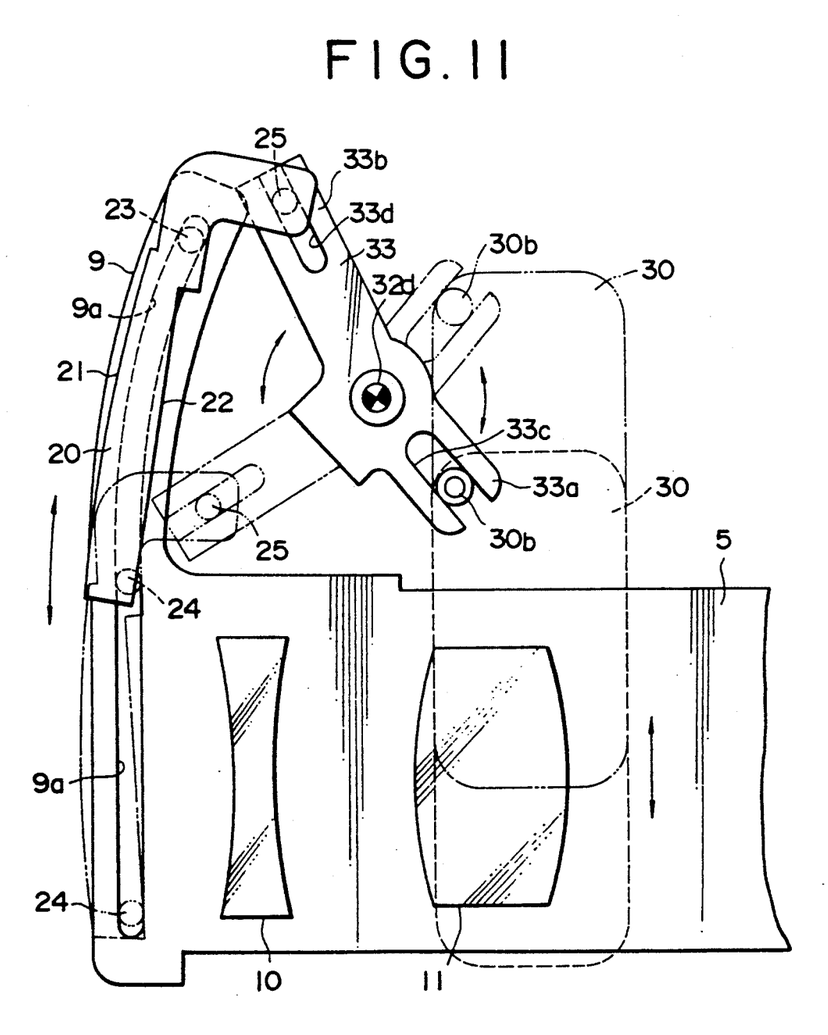
FIG. 11 is a plan view showing a prism driving mechanism in the embodiment.

In FIGS. 8, 11, the delivering mechanism 31 not delivering the motion of the slide plate 30 to the prism comprises an attaching shaft 32d fixed to the body 1 and a driving lever 33 movably attached to the attaching shaft 32d. The driving lever 33 comprises two fork-shaped arms 33a, 33b extending from each other in the opposite direction. One arm, 33a, is engaged with the engaging pin 30b of the slide plate 30 by a slot portion formed at its tip. The other arm 33b, having its tip bent into a U-shape in order to compensate the difference of the height between the prism 20 and the slide plate 30, is engaged with a projecting cam follower pin 25 of the prism 20 penetrating the guide rail 9 through a long and narrow hole 33d in the tip.

The function of a prism-sliding mechanism of the viewfinder according to the embodiment will be hereinafter described referring to FIGS. 8 and 11.

The slide plate 30 is disposed on the position as shown by a dotted line in FIG. 11 by operating the macro lever upon normal photographing. The engaging protuberance 30a of the slide plate 30 is engaged with the engaging hole 32b of the click plate 32, and the slide plate is disposed on the first stop position, and then the prism 20 is disposed in a position outside the optical path of the viewfinder upon normal photographing.

On the other hand, the slide plate 30 is moved by the macro layer to the position shown by the phantom line (two-dot-and-chain line) in FIG. 11 upon macro photographing. This moving makes the driving lever 33 pivot from the solid line position to the phantom line position in FIG. 11, and consequently the prism 20 slides into the optical axis of the viewfinder along the guide rail. When the prism 20 is disposed completely inside the optical axis, the engaging protuberance 30a of the slide plate is engaged with the engaging hole 32c of the click plate 32 and the slide plate 30 itself is disposed on the second stop position.

In this embodiment, a photographing can be quickly operated by the switching from the normal mode to the macro mode with the thumb F, because the macro lever 4 is mounted on the lower surface 1c of the camera body 1.

What is claimed is:

1. A viewfinder mounted on a camera separate from a photographing lens comprising:
   a lens system having an optical axis;
   a prism for correcting parallax between said photographing lens and said lens system by being disposed in said lens system optical axis;
   a driving mechanism for driving said prism slidably in a direction normal to said lens system axis, for inserting said prism into said axis of said lens system upon close-up photographing, and for extracting said prism from said axis of said lens system upon normal photographing;
   means extending transversely to said optical axis, for guiding said prism for slidable movement by said driving mechanism; and
   a close-up photographing lever mounted for movement in a direction substantially transverse to said lens system optical axis.

2. A viewfinder according to claim 1 wherein said prism is inserted into an object side rather than into said lens system.

3. A viewfinder according to claim 1 wherein said prism includes a curved surface having a power for correcting the diopter of the object upon close-up photographing.

4. A viewfinder according to claim 3 wherein said curved surface is a spherical surface.

5. A viewfinder according to claim 1 wherein said lens system is a variable power optical system.

6. The viewfinder mounted on a camera according to claim 1, said guiding means comprising spaced guide rails positioned along the path of movement of said prism.

7. The viewfinder mounted on a camera according to claim 1, said guiding means comprising rails extending transverse to said optical axis for guiding said prism.

8. The viewfinder mounted on a camera according to claim 1, said guide means comprising at least one guide rail extending along the path of movement of said prism.

9. The viewfinder mounted on a camera according to claim 1, wherein said guide means are positioned to insert said prism into the axis of said lens system, externally of said lens system.

10. The viewfinder mounted on a camera according to claim 1, said close-up lever comprising means for providing a driving force to said driving mechanism to drive said prism.

11. The viewfinder mounted on a camera according to claim 1, said driving mechanism further comprising means for generating clicks upon movement of said prism to the inserted and extracted positions.

12. A viewfinder adapted to be mounted on a camera separate from a photographing lens of said camera, said viewfinder comprising:
   a lens system having an optical axis;
   a prism for correcting parallax between the photographing lens and said lens system and being adapted to be selectively disposed along said lens system optical axis;
   said prism comprising a curved surface having a magnifying power for correcting the diopter of an object being photographed in close-up photography; and a driving mechanism for slidably driving said prism in a direction normal to said lens system optical axis, for inserting said prism into said optical axis of said lens system upon close-up photographing, and for extracting said prism from said optical axis of said lens system upon normal photography.

13. The viewfinder adapted to be mounted on a camera according to claim 12, wherein said curved surface of said prism is a spherical surface.

14. A viewfinder adapted to be mounted on a camera, said camera having a photographing lens separate from said viewfinder, the photographing lens being operable in a normal photography mode and in a macro-photography mode, said camera including means for shifting the photographing lens between the normal and macro-photography modes, said viewfinder comprising:

a lens system having an optical axis;
a prism for correcting parallax between the photographing lens and said lens system, said prism being adapted to be inserted into and out of the lens system optical axis; and
means, mounted for movement in a direction different than the direction of insertion of said prism, for inserting said prism into said lens system optical axis in association with movement of the photographing lens between the normal and macro-photography modes.

15. The viewfinder adapted to be mounted on a camera according to claim 14, wherein said inserting means is mounted for movement in a plane substantially transverse to the direction of insertion of said prism.

* * * * *

UNITED STATES PATENT AND TRADEMARK OFFICE
CERTIFICATE OF CORRECTION

PATENT NO. : 5,160,954
DATED : November 3, 1992
INVENTOR(S) : SUZUKI et al

It is certified that error appears in the above-indentified patent and that said Letters Patent is hereby corrected as shown below:

On the title page, Item [75], Inventors: insert; —Tetsuya Abe, Tokyo, each— after "Tokyo" and delete "both".

On the title page, Item [56], Foreign Patent Documents; line 5, change "710976" to —710967—

Column 12, line 4, Claim 12, line 16, change "photographing" to —photography—.

Signed and Sealed this

Fourth Day of January, 1994

Attest:

BRUCE LEHMAN

Attesting Officer          Commissioner of Patents and Trademarks